United States Patent [19]
Griffin et al.

[11] Patent Number: 6,046,731
[45] Date of Patent: Apr. 4, 2000

[54] METHOD AND APPARATUS FOR SPLIT KEYBOARD CONTROL

[75] Inventors: Lee Daniel Griffin; Robert Anthony Campitello, both of Raleigh, N.C.

[73] Assignee: Ericsson Inc., Research Triangle Park, N.C.

[21] Appl. No.: 08/848,481

[22] Filed: May 8, 1997

[51] Int. Cl.[7] .................................................. G09G 5/00
[52] U.S. Cl. ............................................ 345/168; 345/169
[58] Field of Search .................................. 345/168, 169, 345/158, 156, 157, 1, 2, 3; 341/22, 20, 23

[56] References Cited

U.S. PATENT DOCUMENTS

| | | |
|---|---|---|
| 4,689,761 | 8/1987 | Yurchenco . |
| 5,189,543 | 2/1992 | Lin et al. . |
| 5,247,380 | 9/1993 | Lee et al. . |
| 5,307,297 | 4/1994 | Iguchi et al. . |
| 5,424,728 | 6/1995 | Goldstein . |
| 5,870,033 | 2/1999 | Strolo .................................... 341/22 |

FOREIGN PATENT DOCUMENTS

| | | |
|---|---|---|
| 748096 | 12/1996 | European Pat. Off. . |
| WO95/14967 | 6/1995 | WIPO . |

OTHER PUBLICATIONS

Boardless Terminal Keyboard, IBM Disclosure Bulletin, vol. 32, No. 10A, Mar. 1990, pp. 82–84.
Patent Abstracts of Japan, Publication No. 042256120, Publication Date: Oct. 9, 1992, Title: *Computer Input Device,*, Applicant: Kajima Corp.

Primary Examiner—Xiao Wu
Attorney, Agent, or Firm—Burns, Doane, Swecker & Mathis, L.L.P.

[57] ABSTRACT

A method and apparatus are disclosed for providing communication between and among multiple keyboards and a common host. The keyboards can be peers, transmitting to the host either independently (without provision for controlling interference) or cooperatively (communicating with each other prior to communicating with the common host). Alternatively, the keyboards can be prioritized, with lower-priority keyboards transmit to the host only when higher-priority keyboards are not, thereby avoiding interference with the higher-priority keyboards. Also, the keyboards can be prioritized with lower-priority keyboards communicating with the host only through the higher-priority keyboards, the higher-priority keyboards storing and forwarding data from the lower priority keyboards to higher-priority keyboards and/or the host. A method for organizing data from multiple keyboards for transmission to the host is also disclosed, in which the intended message is received by the host in the presence of interference.

23 Claims, 4 Drawing Sheets

METHOD AND APPARATUS FOR SPLIT KEYBOARD CONTROL

FIELD OF THE INVENTION

The present invention relates generally to data communication devices and protocols. More particularly, the present invention relates to data communication between multiple keyboards and a common host.

BACKGROUND OF THE INVENTION

Mechanically and electrically split keyboards are known in which multiple keyboards or keyboard components communicate with a common host (e.g., computer terminal). Such split keyboards can be desirable, for example, to improve user comfort (as disclosed in U.S. Pat. No. 5,424,728) or to allow a keyboard to be greatly reduced in size (e.g., for storage in a compact area) without compromising key button size. The split keyboards typically are each provided with a separate communication means to communicate with the host electronic device. The split keyboards can communicate with the host either by a wire connection or by wireless technologies such as infra-red technology, radio frequency (RF) signals, magnetic signals, etc. A significant problem in such systems relates to insuring that the split keyboards can reliably communicate with the host electronic device. Reliable communication can be made difficult due to interference resulting from the split keyboards attempting simultaneous communication with the host electronic device, or resulting from external interference sources.

Known methods and systems for synchronizing communication between multiple devices and a common host electronic device include hard-wire connections between the multiple devices and the common host electronic device. Known wireless communication methods and systems between multiple devices and a common host include systems such as electronic or video games. A keyboard has significantly more performance requirements than an electronic game keypad; it is far more difficult to synchronize wireless communication between split keyboard devices and a common electronic host. Accordingly, these known methods of synchronization are undesirable for keyboard applications.

U.S. Pat. No. 5,189,543 to Lin et al. discloses an infra-red wireless keyboard system which allows multiple users to operate wireless keyboards without interference. According to this system, each channel is programmed with an individual identifier code and an individual carrier frequency. When a key is depressed, the key code and ID code are transmitted according to the known RS-232 format at a designated frequency. The carrier frequency is designated by the user, and is selected from a range of frequencies. Because the ID codes and carrier frequency associated with each channel is different, multiple users can transmit simultaneously and the common receiver can be tuned to accept only a desired carrier frequency. As should be readily apparent from this description, the system of the Lin patent is undesirably complicated.

It would be desirable for a split keyboard communication system and method to incorporate a relatively simple communication protocol for ensuring reliable communication between two or more split keyboards and a common electronic host.

SUMMARY OF THE INVENTION

The present invention overcomes the above-described problems, and provides additional advantages, by providing for a method and system for transmitting data from multiple transmitters to a common receiver to achieve a reliable wireless split keyboard system. According to the method, data bytes are transmitted from the multiple transmitters to the common receiver with error correction protection; the data bytes received from the multiple transmitters are stored in a buffer at the common receiver; and then it is determined, at the common receiver, whether each stored data byte is a valid byte based on the error correction protection.

The multiple transmitters can be peers which transmit signals to the host independently without provision for interference control, or peers which avoid interference by monitoring each other's transmissions, and transmitting data to the host electronic device only when no other devices are transmitting to the host. Alternatively, a priority level is assigned to each of the multiple devices, with lower-priority devices monitoring higher-priority devices and transmitting data to the host only when no higher-priority devices are transmitting to the host. According to a further alternative, the lower-priority devices transmit data to the host via the higher-priority devices, with the higher-priority devices storing and forwarding the data transmitted from the lower-priority devices.

The information received at the common host electronic device is appropriately organized so as to recover the intended message in the presence of interference among the transmitted data.

BRIEF DESCRIPTION OF THE DRAWINGS

A more complete understanding of the present invention can be obtained upon reading the following Detailed Description of the Preferred Embodiments, in conjunction with the accompanying drawings, in which like reference indicia are used to designate like elements, and in which.

DETAILED DESCRIPTION OF THE PREFERRED EMBODIMENTS

While the following discussion is directed to a split keyboard system having two keyboards associated with a common host computer, it is to be understood that the principles of the present invention can be readily applied to system having more than two split keyboards, and can be applied to other communication systems. It should be appreciated that in FIGS. 1–3, the split keyboards are depicted as unconnected blocks to emphasize their independent nature. In implementation, the keyboards would typically be mechanically connected.

Figure 1:
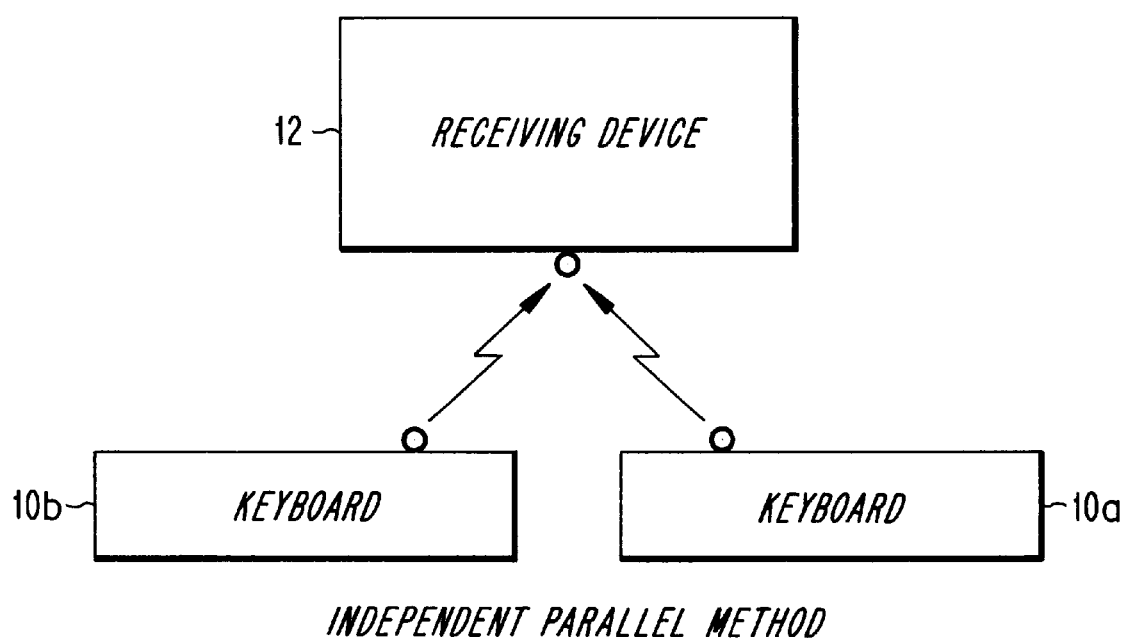
FIG. 1 is a block diagram of a first embodiment of a system according to the present invention.

FIG. 1 shows a block diagram of a first embodiment of a system according to the present invention. According to this embodiment, split keyboards 10a and 10b are peers which simultaneously and independently communicate with a common host electronic device 12 via, e.g., a wireless infra-red protocol. The keyboards 10a and 10b can transmit key code data to the electronic device using the same carrier frequency or different carrier frequencies. The device 12 includes a receiving means, such as one or more receive buffers, and determines the proper sequence of asynchronous key codes as they are sent to the receive buffer(s) in a manner to be described in more detail below. No modifications to the existing receiver hardware are necessary; the receiver in the device 12 simply receives each byte of data as it is transmitted by the keyboards and stores the received bytes in the one or more receive buffers. While not necessary, it may be desirable to increase the size and/or number of the receive buffers in the device 12 or to service the receive buffers more frequently. This is because the average rate at which the electronic device receives data from the keyboards 10a and 10b will be similar to the normal transmission rate of a single keyboard, but the transmission rate of the split keyboards 10a and 10b (each transmitting at the normal rate) is theoretically higher than the normal transmission rate. Therefore, it may be desirable to increase the size, number, or servicing rate of the receive buffer in order to prevent buffer overflow errors.

It will be appreciated that the embodiment of FIG. 1 presumes that the two wireless keyboards 10a and 10b will rarely, if ever, transmit data to the device 12 simultaneously. If the keyboards 10a and 10b do transmit simultaneously, the device 12 will either detect an error condition and ignore the data, or misinterpret the data as a keystroke which was not intended by the user(s) of the keyboards 10a and 10b. Some form of error correction coding (e.g., even/odd parity bits, checksum bits, and/or stop bits) can be used in the communication protocol to allow the receiver to detect and correct errors (e.g., invalid keyboard codes, etc.).

Alternatively, the split keyboards 10a and 10b can be peers which monitor each other to determine (by, e.g., detecting whether a carrier frequency is present) whether the other is transmitting data to the host device 12. For example, if a user of keyboard 10a attempts to transmit data to the device 12, keyboard 10a will first determine if keyboard 10b is transmitting data to the device 12. If keyboard 10b is transmitting data to the device 12, keyboard 10a will wait until the transmission from keyboard 10b stops. If keyboard 10b is not transmitting data to the device 12, then keyboard 10a will transmit its data to the device 12. Keyboard 10b (and all other split keyboards, if more than two split keyboards exist in the system) follows the same protocol.

Figure 2:
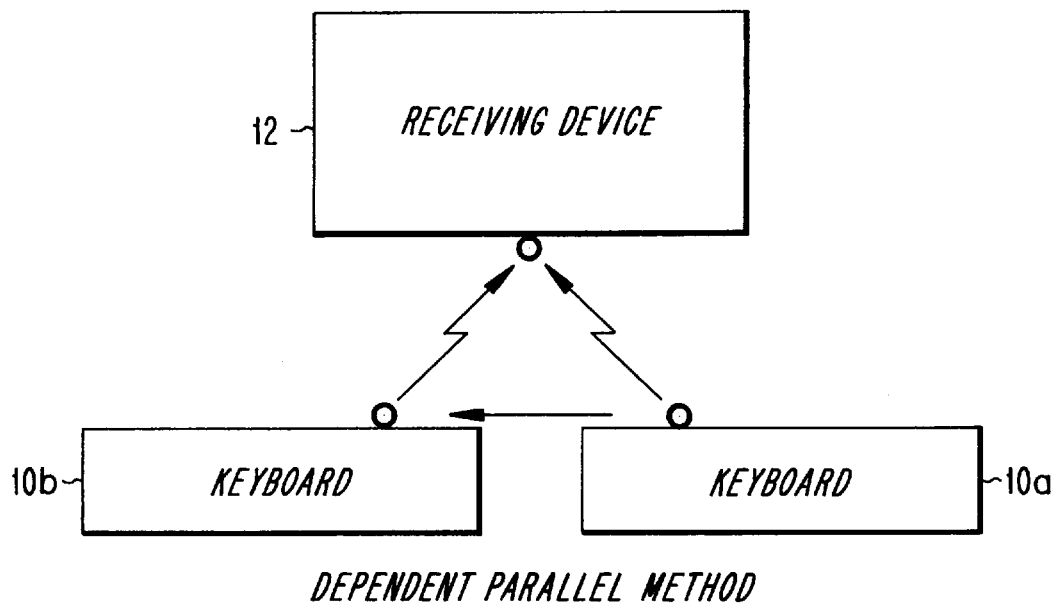
FIG. 2 is a block diagram of a second embodiment of a system according to the present invention.

FIG. 2 shows a second embodiment of a split keyboard system according to the present invention. In this second embodiment, the split keyboards are each assigned a priority level. For purposes of explanation, it will be assumed that keyboard 10a is the higher-priority keyboard and keyboard 10b is the lower-priority keyboard. Based on these assumptions, the higher-priority keyboard 10a can transmit data to the device 12 asynchronously at any time the user of higher-priority keyboard 10a desires to transmit data. The data is received in the one or more receive buffers of device 12 at a predetermined rate. The lower-priority keyboard 10b can transmit data to the device 12 only when the higher-priority keyboard 10a is not transmitting data to the device 12. Accordingly, prior to transmitting data to the device 12, the lower-priority keyboard 10b detects whether the higher-priority keyboard's carrier frequency is present and if so, the lower-priority keyboard 10b will inhibit the transmission of its data and store the inhibited data in a buffer until the higher-priority keyboard's carrier frequency is no longer present, at which time the buffered data will be transmitted to the device 12. Preferably, the higher-priority keyboard 10a and the lower-priority keyboard 10b only transmit a carrier frequency when they are sending data. The lower-priority keyboard 10b can transmit data at a different predetermined rate, and may transmit data on the same or a different carrier frequency as the higher-priority keyboard 10a.

Figure 3:
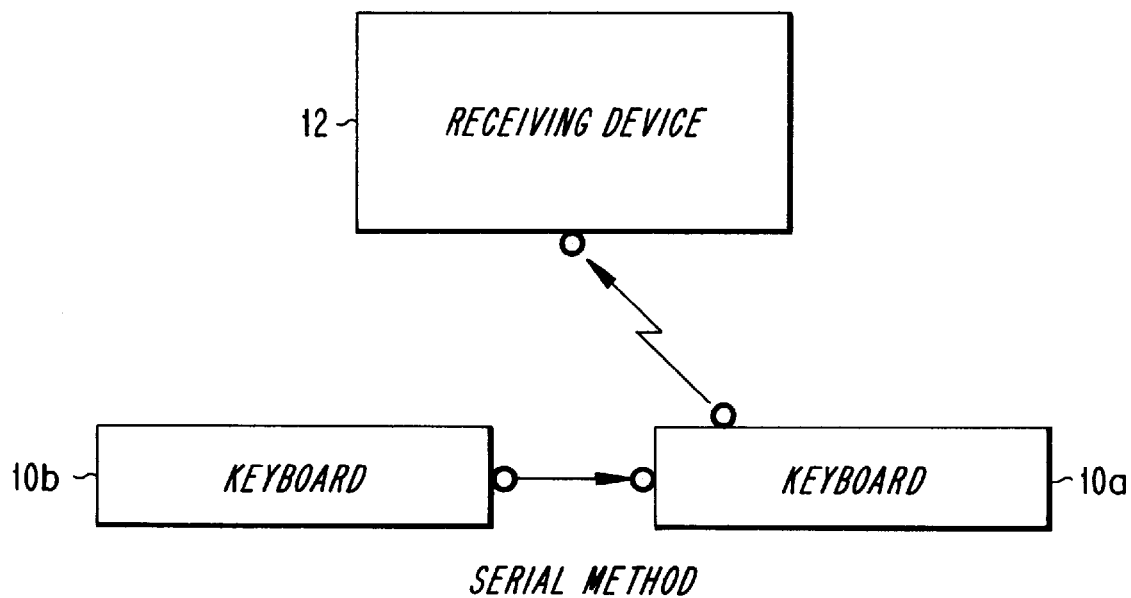
FIG. 3 is a block diagram of a third embodiment of a system according to the present invention.

FIG. 3 shows a third embodiment of the present invention. In this embodiment, the lower-priority keyboard 10b transmits data to the higher-priority keyboard 10a rather than directly to the electronic device 12. The higher-priority keyboard 10a receives the data from the lower-priority keyboard 10b, stores the data in a buffer, synchronizes the data with its own data, and transmits the synchronized data to the device 12. This embodiment is particularly beneficial in that the infrared power consumption of the lower-priority keyboard 10b is significantly reduced, since it need only transmit data over a much shorter distance than the higher-priority keyboard must transmit.

Regardless of whether the split keyboards are peers or have an assigned priority level, the data signals transmitted from the keyboards must be reliably combined and organized for processing by the host electronic device 12. This requirement holds regardless of whether the signals are combined at a higher-priority keyboard or at the device 12. Accordingly, an exemplary embodiment of a method for combining signals from multiple keyboards will now be described.

Most keyboard protocols include scan codes known as "make" and "break". The make code is typically a single byte and is transmitted by the keyboard when a key is depressed. A break code is typically two or more bytes and is sent when a key is released. If the break code is interrupted, the device will not receive a complete break code and errors will result. Because the reception of a complete break code is so important, break codes are typically only two bytes in length and the first byte is typically the same for all break codes. According to an aspect of the present invention, if the device 12 detects that a break code is being sent from one keyboard, the device 12 will then store any other data received from any other keyboard until the device receives the complete break code sequence from the first keyboard. Once the complete break code sequence is received, the stored data can be sent to the device 12 (if the synchronization of data from multiple keyboards is performed in a keyboard) or processed by the device 12 (if the synchronization takes place in the device itself).

This break code procedure can be better explained by the following examples, in which a first key has a make code of 2D and a break code of F0 2D, while a second key has a make code of 54 and a break code of F0 54. The first example assumes that the following codes are transmitted in the following order:

Keyboard 10a: 2D F0 2D

Keyboard 10b: 54 F0 54

The device performing the synchronization receives the following codes (in order): 2D (from 10a), 54 (from 10b), F0 (from 10a), F0 (from 10b), 2D (from 10a) and 54 (from 10b). Once the device receives F0 (from 10a), it realizes that keyboard 10a has initiated the break code, but the break code was interrupted by the F0 from keyboard 10b. Accordingly, the device stores the first F0 (from 10a) in a transmit buffer, stores the second F0 (from 10b) in another buffer, stores the next code from keyboard 10a (in this case, 2D) in the transmit buffer, and then transfers the stored data from the other buffer (here, the F0 from 10b) to the transmit buffer such that the final sequence transmitted to or processed by the device 12 is: 2D, 54, F0, 2D, F0, 54.

In the second example, the following codes are transmitted in the following order:

Keyboard 10a: 2D F0 2D
Keyboard 10b: 54 F0 54

In this example, the code "54" (first occurrence) from keyboard 10b is stored in the second buffer as described above with respect to the first example, and the final sequence transmitted to or processed by the device 12 is: 2D, F0, 2D, 54, F0, 54. If the synchronization is not properly performed in this example, the device 12 may match the first "54" from keyboard 10b with the "F0" from keyboard 10a, which would be an erroneous break code for the key depressed on keyboard 10a.

Figure 4A:
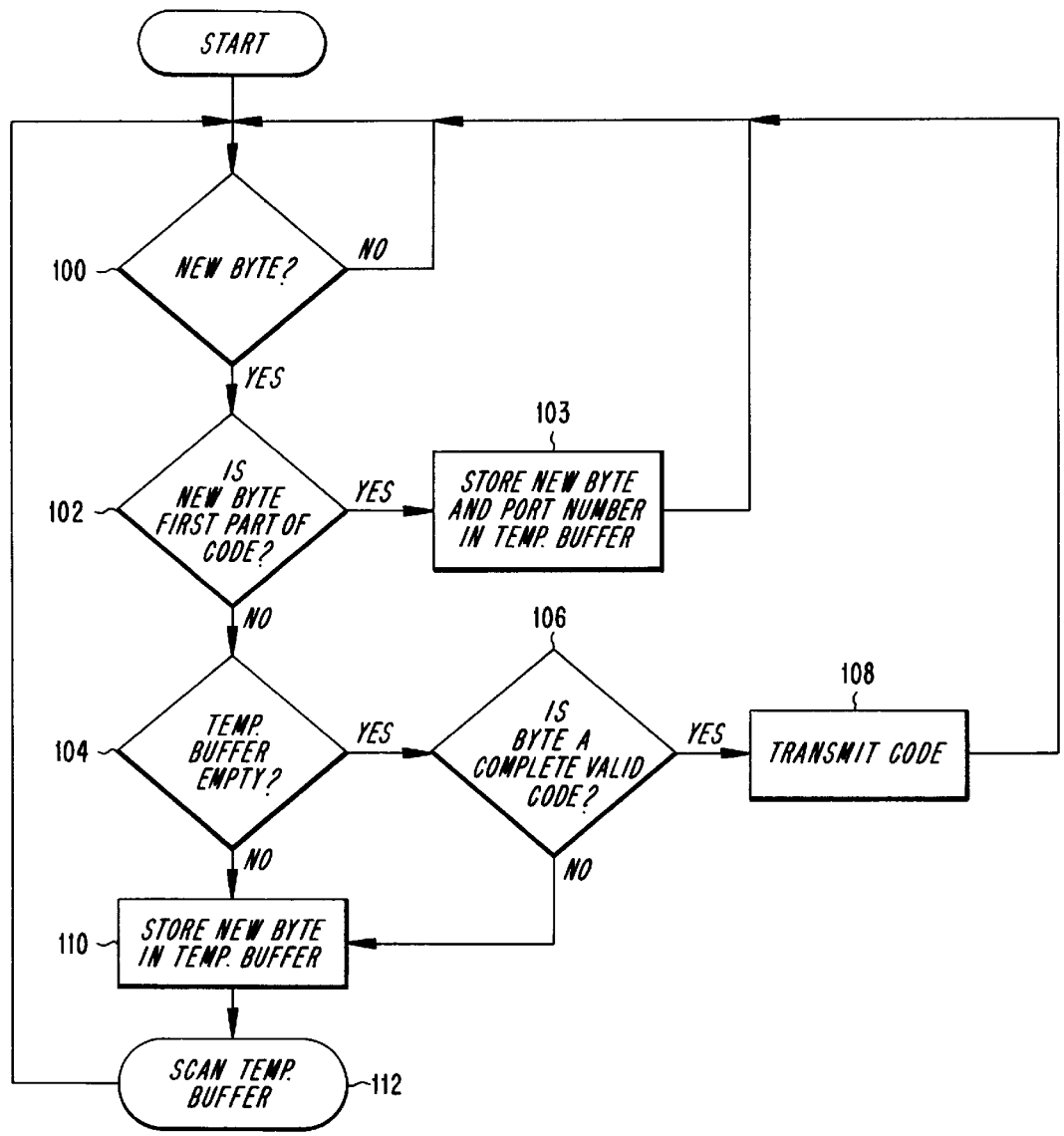
FIGS. 4A–B are flow charts describing first and second parts, respectively, of a method for transmitting codewords from a split keyboard or other transmission device to the common host electronic device.
Figure 4B:
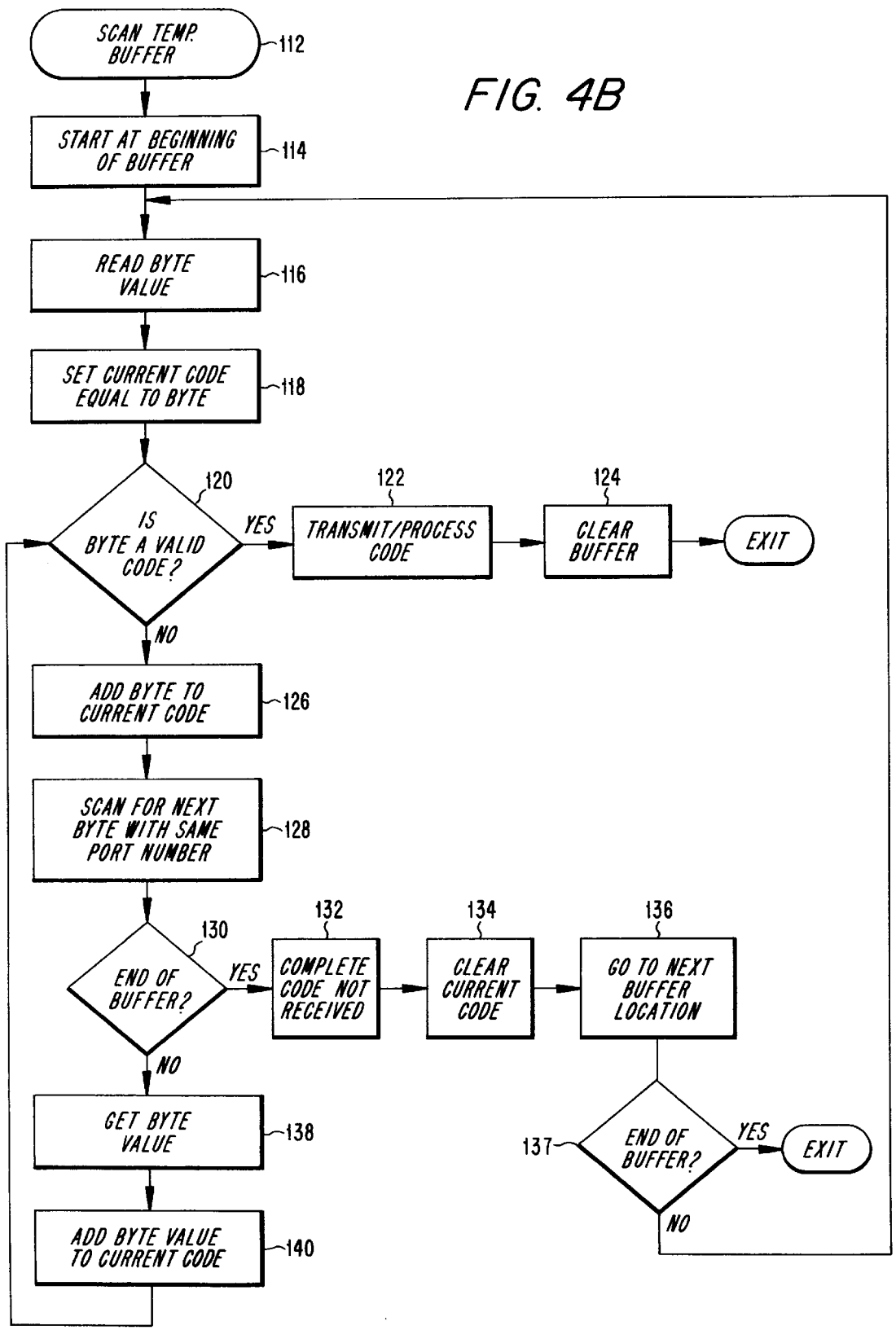

FIGS. 4A–B are flow charts describing first and second portions of a synchronization procedure according to the present invention in detail. This synchronization procedure can be implemented by a synchronization means present within a keyboard or the device 12, and ensures that data code bytes from each of the split keyboards remain intact for transmission to, or processing by, the device 12. In FIG. 4A, the synchronization means determines in step 100 whether a new data byte has been received. If no new data byte has been received, the process returns to step 100. If a new data byte has been received, the process continues in step 102, where the synchronization means determines if the received byte is the first part of a multi-part code. If the received byte is the first part of a code, then the byte and its associated port number (i.e., identifier assigned to the keyboard which transmitted the byte) is stored in a temporary buffer in step 103, and the process returns to step 100. Alternatively, if the received byte is not the first part of a multi-part code, the method proceeds to step 104, where the synchronizing means determines whether the temporary buffer is empty. If the temporary buffer is empty, then the synchronization means determines whether the received byte is a valid data code by itself in step 106. If the byte represents a valid data code, the code is transmitted to the receiver in step 108 (i.e., is transmitted to the device 12 if the synchronization is performed in a keyboard or is processed by the device 12 if the synchronization is performed in the device 12), and then the process returns to step 100.

If the temporary buffer is determined to be not empty (step 104) and the received byte is not a valid data code by itself (step 106), then the byte (with associated port number) is stored in the temporary buffer in step 110. New bytes are preferably added to the end of the temporary buffer in order to maintain correct chronological sequence. After a byte which is not the first part of a code and not a valid code by itself is stored in the temporary buffer, the synchronization means performs a scanning operation of the temporary buffer in step 112. The scanning operation will be described in more detail with respect to the flow chart of FIG. 4B.

FIG. 4B is a flow chart describing a second portion of the synchronization process, the temporary buffer scanning operation. This operation begins in step 114, which starts the scanning of the temporary buffer at the beginning of the buffer. In step 116, the byte value contained in the buffer is read. In step 118, the synchronization means initiates a "current code" set to the value of the first byte in the buffer. The current code is a memory space in which a complete keyboard code is reconstructed one byte at a time. In step 120, the synchronization means determines whether the current code is a valid code. If the code is valid, it is transmitted/processed in step 122, the buffer is cleared in step 124, and the scanning operation ends, returning the process to step 100 (FIG. 4A).

If the code is not valid, the byte is added to the current code in a memory space in step 126, and the synchronization means scans the temporary buffer for the next byte having the same port identifier in step 128. If the end of the temporary buffer is reached in step 130 without finding a data byte having the same port identifier, then the synchronization means determines that a complete code has not been received in step 132, clears the current code sequence in step 134, advances to the next location in the temporary buffer in step 136 (i.e., assuming the data byte read in step 116 was the first data byte in the temporary buffer, step 136 returns the process to the second data byte in the temporary buffer), and the process exits or returns to step 116.

If a data byte having the same port identifier is reached before the end of the temporary buffer is reached as determined in step 130, the synchronization means takes this next byte value having the same port identifier as the previous byte in step 138, and adds this byte value to the end of the current code in step 140. The process then returns to step 120 to determine whether the current code is a valid code.

It should be appreciated that although the embodiments described above assume a wireless connection between the split keyboards 10a and 10b, the schemes of the present invention can be implemented using a wired link between the split keyboards. In a wired implementation, an asynchronous data protocol can be used to communicate over the wireline connection. The higher-priority keyboard can combine the serial outputs of the matrix keyboard decoding circuits and then communicate serially with the device 12 by standard infrared or wired protocols for serial asynchronous data.

While the foregoing description includes numerous details and specificities, it is to be understood that these are for purposes of explanation only. Many modifications will be readily apparent to those of ordinary skill in the art which are clearly within the spirit and scope of the invention, as defined by the following claims and their legal equivalents.

What is claimed is:

1. A method for transmitting data corresponding to key code data entered into a keyboard to a receiver, comprising the steps of:

entering key code data in an order via multiple keyboard elements of a split keyboard;

transmitting via transmitters data bytes of said key code data to a common receiver;

storing said transmitted data bytes received from each of said multiple keyboard elements in a buffer at the common receiver; and synchronizing said stored transmitted data bytes such that said data bytes are organized into said order in which said key code data was entered into said multiple keyboard elements of the split keyboard.

2. The method of claim 1, further comprising the step of monitoring, at each of the transmitters, all of the other transmitters, wherein the step of transmitting is performed by each of the transmitters only when the step of monitoring indicates that all of the other transmitters are not transmitting data bytes to the common receiver.

3. The method of claim 1, wherein the multiple keyboard elements of the split keyboard comprise the transmitters.

4. The method of claim 1, wherein the step of transmitting is performed using infrared signals.

5. The method of claim 1, wherein each of the transmitters is assigned a priority level, and the step of transmitting is performed such that lower priority transmitters transmit data only when higher priority transmitters are not transmitting.

6. The method of claim 5, wherein the lower priority transmitters transmit data at a lower data rate, and the higher priority transmitters transmit data at a higher data rate.

7. The method of claim 5, wherein the lower priority transmitters transmit data at a lower-priority frequency and the higher priority transmitters transmit data at a higher-priority frequency.

8. The method of claim 7, wherein the lower priority transmitters determine whether a carrier signal having a higher-priority frequency is present prior to transmitting data.

9. The method of claim 8, wherein the lower priority transmitters store data to be transmitted in a transmitter buffer while the carrier signal having the higher-priority frequency is present, and transmit the stored data to the common receiver when the carrier signal having the higher-priority frequency is no longer present.

10. The method of claim 1, wherein each of the transmitters is assigned a priority level, and the step of transmitting is performed such that one or more lower priority transmitters transmit data to the common receiver through the one or more higher priority transmitters.

11. The method of claim 10, further comprising the step of receiving, at the one or more higher priority transmitters, data transmitted from the one or more lower priority transmitters, storing the data transmitted from the one or more lower priority transmitters in a buffer in the one or more higher priority transmitters, and synchronizing the data transmitted from the one or more lower priority transmitters to data to be transmitted from the one or more higher priority transmitters, prior to the step of transmitting.

12. The method of claim 10, wherein the distance between each of the transmitters is less than the distance between a highest-priority transmitter and the common receiver.

13. The method of claim 11, wherein the step of storing is performed by storing the data transmitted from the one or more lower priority transmitters in a first buffer and storing a data byte identifier and a transmitter identifier in a second buffer, the transmitter identifier identifying the lower priority transmitter associated with the transmitted data.

14. The method of claim 1, wherein the step of synchronizing further comprises organizing the transmitted data bytes for processing by the common receiver.

15. The method of claim 14, wherein the step of organizing is performed by:

detecting whether a break code transmitted from one of the transmitters is contained in a transmitted data byte; and storing data bytes from any other of the transmitters in a separate buffer until the common receiver receives a complete break code sequence from the one of the transmitters which sent the break code.

16. The method of claim 15, wherein the separate buffer is contained in a transmitter.

17. The method of claim 15, wherein the separate buffer is contained in the common receiver.

18. A keyboard system for receiving entry of key code data, the keyboard system being wirelessly coupled to a common receiver, comprising:

a split keyboard with at least two keyboard elements for transmitting data bytes of key code data entered in an order into the split keyboard;

a common receiver for receiving the data bytes; and synchronizing means for organizing the data bytes into said order for processing by the common receiver.

19. The system of claim 18, wherein the keyboard elements have substantially equivalent priority with respect to each other, and each of the keyboard elements monitors all other keyboard elements and transmits key code data only when none of the other keyboard elements are transmitting key code data.

20. The system of claim 18, wherein each of the keyboard elements is assigned a priority level.

21. The system of claim 20, wherein lower priority keyboard elements transmit key code data only when higher priority keyboard elements are not transmitting key code data.

22. The system of claim 20, wherein lower priority keyboard elements transmit key code data to the common receiver through higher priority keyboard elements.

23. The method of claim 1, wherein the step of synchronizing further comprises determining, at the common receiver, whether each of said stored transmitted data bytes completes a valid data code.

* * * * *